United States Patent
Fortner et al.

(10) Patent No.: US 6,701,790 B2
(45) Date of Patent: Mar. 9, 2004

(54) TEMPERATURE REGULATOR FOR USE WITH A PRESSURE SENSING DEVICE

(75) Inventors: Michael W. Fortner, Plano, TX (US); Shiyuan Cheng, Richardson, TX (US); Daryl L. Buchanan, Allen, TX (US); Dwight S. Larson, Allen, TX (US)

(73) Assignee: Mykrolis Corporation, Billerica, MA (US)

( * ) Notice: Subject to any disclaimer, the term of this patent is extended or adjusted under 35 U.S.C. 154(b) by 0 days.

(21) Appl. No.: 10/064,137

(22) Filed: Jun. 13, 2002

(65) Prior Publication Data

US 2003/0231697 A1 Dec. 18, 2003

(51) Int. Cl.$^7$ .............................. G01L 19/04; G01K 1/08

(52) U.S. Cl. ............................................. 73/703; 374/143

(58) Field of Search .......................... 73/708, 714, 718, 73/724, 747–750; 340/584, 682, 691.1, 331, 332; 374/143, 163, 166, 167, 187, 189

(56) References Cited

U.S. PATENT DOCUMENTS

| | | |
|---|---|---|
| 4,199,023 A | 4/1980 | Phillips |
| 4,706,736 A | 11/1987 | Gyori |
| 6,508,407 B1 * | 1/2003 | Lefkowitz et al. ............ 236/51 |

OTHER PUBLICATIONS

International Search Report for PCT/US03/18492 mailed Sep. 5, 2003.

* cited by examiner

*Primary Examiner*—William Oen
(74) *Attorney, Agent, or Firm*—Gray Cary Ware & Freidenrich, LLP

(57) ABSTRACT

A system and method for regulating the temperature of a sensor to reduce temperature gradients that form within the sensor. In one embodiment, the temperature gradients are reduced utilizing a temperature regulator with two controlled zones that surround a variable capacitance sensor. Measurements are made for the ambient temperature of at least one of the two temperature controlled zones, and the temperature differential between the two temperature controlled zones. The temperature regulator then adjusts the temperature of the two controlled zones based upon this differential in order to minimize the existing temperature gradient.

31 Claims, 3 Drawing Sheets

*FIG. 1*
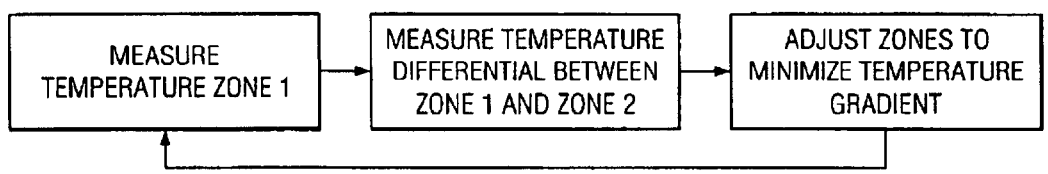
*FIG. 2A*
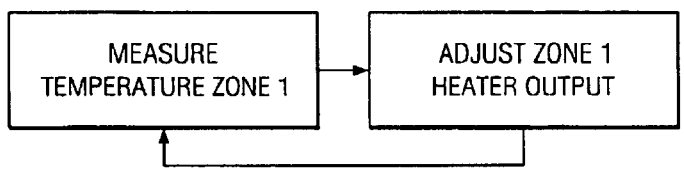
*FIG. 2B*
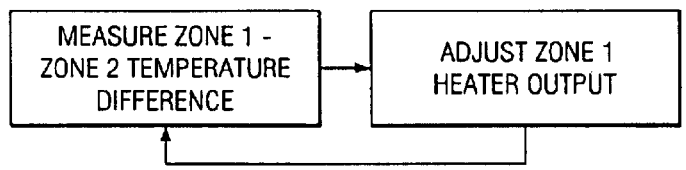
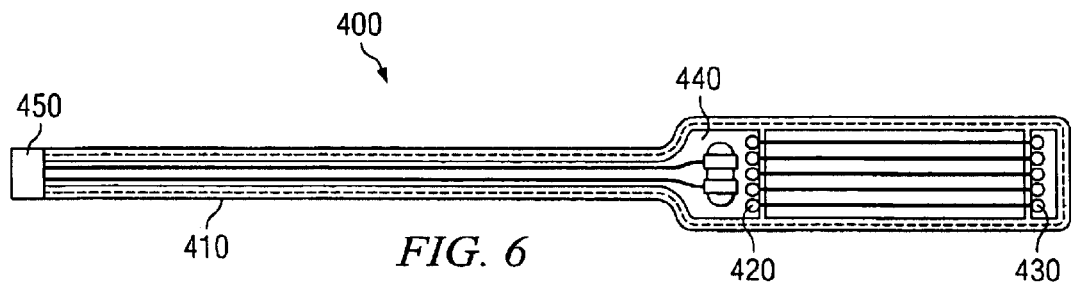
*FIG. 6*

TEMPERATURE REGULATOR FOR USE WITH A PRESSURE SENSING DEVICE

BACKGROUND OF INVENTION

Technical Field of the Invention

The present invention relates generally to systems and methods for accurately measuring pressure, and more particularly, to a system and method for improving the performance of a pressure measuring device by regulating its temperature.

Background of the Invention

Pressure sensors are used extensively throughout the semiconductor industry in fabrication processes in order to control the flow of process gases to process chambers. In particular, variable capacitance manometers can be utilized to measure and regulate the pressure of these gasses. The sensing element within a variable capacitance manometer is a diaphragm which is deflected by the pressure of process gases. Closely positioned near the diaphragm is a fixed electrode, forming a capacitor which translates deflections in the diaphragm into a change in capacitance reflective of the pressure of the process gas.

When used in fabrication processes, the sensor is exposed to the flow of process gases. Often, these gases become contaminated during the fabrication process, and may in turn contaminate the diaphragm of the variable capacitance manometer. The process gases may also condense upon the diaphragm and subsequently react with the material of the diaphragm to form a layer of undesired material. Because the function and accuracy of the manometer is based upon deflection of the diaphragm, the weight and thickness added to the diaphragm from these process-related by-products can impair the accuracy of the variable capacitance manometer. Ultimately, this layer of by-products may swell to such proportions that the difference capacitance manometer ceases functioning altogether.

To prevent the formation of this unwelcome layer of by-products, the variable capacitance manometer can be operated at an elevated temperature, typically slightly above the process temperature. In the vast majority of cases, elevation of the sensor's temperature is accomplished through the use of an oven. This oven is typically a structure which surrounds the variable capacitance sensor and regulates its temperature.

Heating the variable capacitance sensor using these conventional ovens, however, comes replete with its own set of pitfalls. The accuracy of the sensor is dependent upon the uniformity and the consistency of the temperature within the sensor, but the evenness of temperature within the sensor is often affected by heat loss through, for example, the vacuum fitting coupling the sensor to the remainder of the process gas flow system. Since this structure protrudes from the oven and is exposed to external influences it is typically cooler than the remainder of the sensor. Because this is usually where the most heat loss occurs, in most designs the sensor is heated at the point where the sensor is vacuum fitted to the remainder of the process gas flow system. In other areas, the sensor is heated indirectly through an airspace. While this indirect heating does tend to reduce temperature gradients in the sensor's structure, it typically results in an over-sized oven with a large air-space between the sensor and oven walls and, in general, a large and inefficient package.

Another approach, elimination of the oven airspace by utilizing simple, direct heating of the sensors results in a more compact, energy efficient design which reaches a set point more quickly. Unfortunately, these existing directly heated designs suffer dramatically from the effects of temperature gradients and perturbations within their structures.

Ultimately, there is a need for a system and method that has the improved accuracy and other advantages of an oven heated pressure sensor with neither the size of an indirect heating unit nor the effects of temperature gradients created in a directly heated temperature sensor.

SUMMARY OF INVENTION

The present invention provides a temperature regulating system and method, the various embodiments of which substantially eliminate or reduce the disadvantages and problems associated with previously developed systems and methods.

More specifically, one embodiment of the present invention provides a system and method of heating the pressure sensing element of a pressure sensing device such as a variable capacitance manometer, and minimizing the temperature gradients within the sensor's structure. The temperature regulating system and method include a temperature regulating device that surrounds a pressure sensor and can convey heat to select zones of the sensor. A temperature sensor monitors these zones and the temperature in one or more of these zones is adjusted based upon the measured temperature differential between the zones.

In one embodiment, the present invention provides the ability to more accurately measure temperature gradients and adherence to a set point by utilizing an ambient temperature measurement device in combination with a measurement of the temperature differential between the temperature regulated zones.

One embodiment of the present invention offers an important technical advantage by providing a more direct and compact means of heating the pressure sensing element of a variable capacitance manometer.

One embodiment of the present invention offers another technical advantage by reducing the amount of insulation between the temperature regulator and the pressure sensor.

One embodiment of the present invention offers yet another technical advantage by reducing the amount of energy consumed in regulating the temperature of the sensor.

One embodiment of the present invention offers a further technical advantage by reducing the amount of time that is required for the pressure sensor to reach a set point temperature.

BRIEF DESCRIPTION OF DRAWINGS

For a more complete understanding of the present invention and the advantages thereof, reference is now made to the following description taken in conjunction with the accompanying drawings in which like reference numerals indicate like features and wherein:

FIG. 1 shows a flowchart of one method of temperature regulation of the present invention.

FIGS. 2A and 2B show a pair of flowcharts illustrating simultaneously executed control loops in one embodiment of the invention.

FIG. 6 shows an embodiment of the temperature sensor of the present invention.

DETAILED DESCRIPTION

Figure 3:
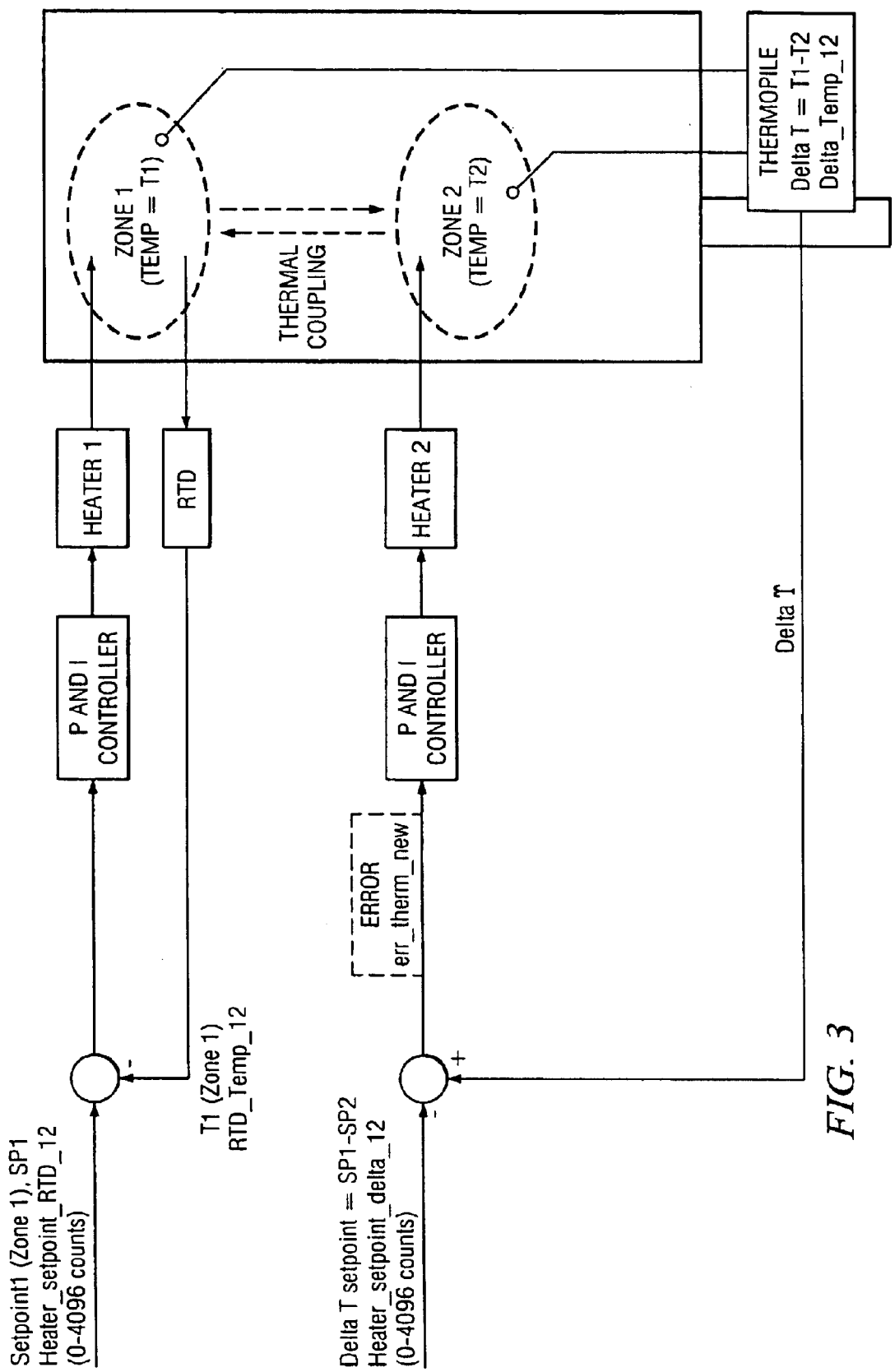
FIG. 3 shows a diagram of a control system implementing the control loops of FIGS. 2A and 2B.

Preferred embodiments of the present invention are illustrated in the figures, like numerals being used to refer to like and corresponding parts of the various drawings.

Pressure sensors can exist within a gas panel or gas flow path for use in, e.g., measuring the pressure of gases flowing to a semiconductor fabrication process chamber. These pressure sensors are instrumental in regulating delivery of those process gases.

One embodiment of the present invention provides a pressure sensor that consists of a temperature regulator which may be coupled to a pressure sensor and a temperature sensing device. The temperature regulator has two temperature-regulated zones which can be controlled independently of one another. The temperature sensor measures the difference between the two zones and a controller adjusts the temperature accordingly.

A major technical advantage of certain embodiments of the present invention is that they allow a drastic reduction in the temperature gradients that occur throughout a pressure sensor. Because these temperature gradients are reduced utilizing independently regulated heating zones, this allows yet another technical advantage, reducing the amount of insulation required between the temperature regulator and the pressure sensor.

Another technical advantage of certain embodiments of the present invention is a more direct and compact means of heating the pressure sensing element of a variable capacitance manometer.

Yet another technical advantage of certain embodiments of the present invention is a reduction in the amount of energy consumed in regulating the temperature of the sensor.

Still another advantage of certain embodiments of the present invention is that they reduce the time it takes for the pressure sensor to reach an optimum operating temperature.

A further advantage of certain embodiments of the present invention is that they provide the ability to more accurately measure temperature gradients and adherence to a set point by utilizing an ambient temperature measurement device in combination with a measurement of the temperature differential between the temperature regulated zones.

Turning now to FIG. 1, a method of the present invention is represented in a flowchart. By reducing temperature gradients throughout a pressure sensor, the method of the present invention allows a reduction in size of the temperature regulator while closely adhering to a set point and simultaneously preventing buildup of undesirable by-products from a reaction with the gas in a pressure sensor, such as a variable capacitance manometer. Reduction of temperature gradients is accomplished through the constant monitoring and controlling of the temperature of the dual-zone temperature regulator which is thermally coupled to the pressure sensing device.

This reduction is accomplished by minimizing the temperature difference in the two heated zones. In one embodiment of the present invention, temperature is measured by the use of a flexible printed circuit board which contains a thermopile for monitoring the temperature difference between two heated zones of a variable capacitance manometer. This thermopile utilizes two thermocouple junctions-one thermocouple junction placed in one of the temperature regulated zones, and the other thermocouple junction placed in the other temperature regulated zone. In response to the difference in temperature, at least one of the temperature regulated zones is adjusted to compensate for any temperature differential. This process may be iterated during the operation of the pressure sensor.

In one embodiment of the present invention, a voltage differential is generated by the two thermocouple junctions based upon the temperature differential existing between the two temperature regulated zones. This voltage differential is reported to a closed loop controller. The closed loop controller then determines an appropriate adjustment to reduce the temperature gradient between the two zones, and adjusts the temperature in one or more of the zones accordingly so that the thermocouple junctions are balanced and no voltage differential exists at the output of the thermopile.

In one embodiment, two independent control loops operate simultaneously. Referring to FIGS. 2A and 2B, a pair of flow diagrams illustrate these control loops. FIG. 2A depicts a control loop corresponding to the control of a first zone, while. FIG. 2B depicts a control loop corresponding to the control of a second zone. These control loops operate to maintain the first zone at an absolute temperature setpoint, and to maintain the second zone to maintain a differential setpoint between the zones. The overall control system implementing these control loops is illustrated in FIG. 3.

Figure 4:
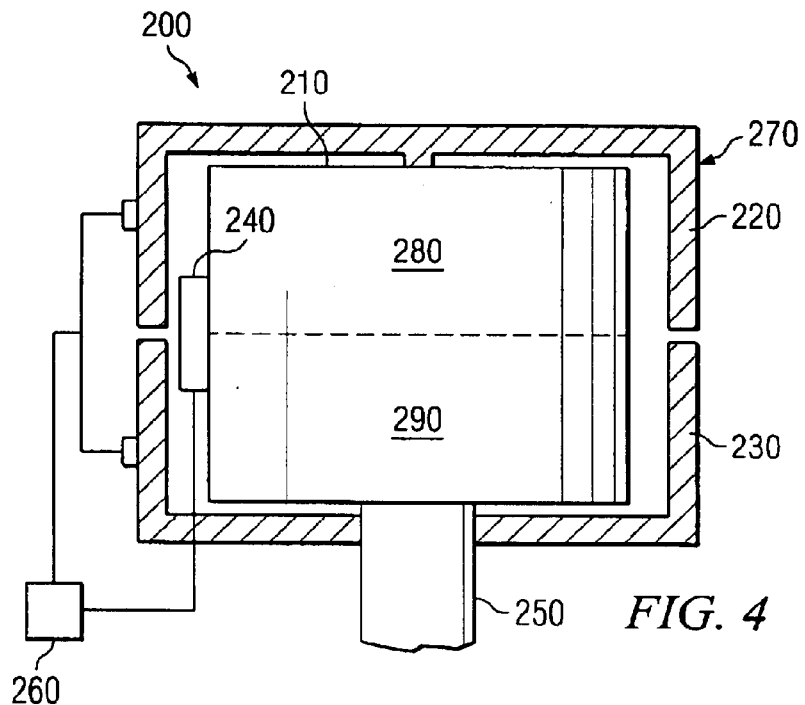
FIG. 4 shows a diagram of one embodiment of the system and method of temperature regulation of the present invention.

FIG. 4 portrays a diagram of such an embodiment. During operation, gas enters the system 200 through a conduit 250 which ties the variable capacitance manometer 210 to the gas flow. This gas acts upon a diaphragm which is present in variable capacitance sensor 210 creating a change in capacitance as a function of pressure of the gas flowing through conduit 250. In order to prevent the buildup of by-products caused by the flow of gas through conduit 250, variable capacitance sensor 210 is operated at an elevated temperature. This heating process is accomplished by temperature regulator 270, which in one embodiment comprises two cups 220, 230, composed of thermally conductive material, each of which corresponds to a temperature regulated zone 280, 290. Each cup is heated around its circumference by a heating element, and is thermally coupled to the variable capacitance sensor 210. These cups 220, 230 transfer heat to the variable capacitance sensor 210 through conduction, convection, and radiation. Because the accuracy of the variable capacitance sensor's 210 output is heavily dependent on the accuracy of the temperature set point and the uniformity of the variable capacitance manometer's heating, temperature sensor 240 measures both the ambient temperature in one temperature regulated zone of variable capacitance sensor 210, and the difference in temperature between the two temperature regulated zones 220, 230. In one embodiment of the present invention the temperature sensor 240 measures the ambient temperature through the use of a resistive thermocouple device, and monitors the temperature difference between the two zones 220, 230 through the use of thermocouple junctions.

Referring again to FIG. 4, the values of the ambient temperature, and the temperature differential between the two zones 220, 230 of variable capacitance manometer 210, are conveyed to a controller 260. Controller 260 receives the ambient temperature and temperature differential and controls the temperature regulator, which in turn regulates the temperature zones 220, 230. This regulation of temperature zones 220, 230 allows a substantial reduction in the temperature gradient between the two zones, and closer approximation of a set point temperature.

The temperature regulation of the two zones 220, 230 also allows the use of a smaller, more efficient package by substantially eliminating the need for a large air space between the variable capacitance sensor 210 and the temperature regulator 270. A small layer of thermal insulation between each cup 220, 230 and the variable capacitance sensor 210 may help the cups to serve as a guarding structure, surrounding the variable capacitance sensor 210 and protecting it from undesired heat transfer. This layer of insulation may be composed of air, or in another embodiment insulating foam, or the like.

Although the temperature regulator described above may substantially reduce temperature gradients within the sensor, it is difficult to dispense with these temperature gradients completely. The localized nature of heat from a heat source and generalized, inconsistent heat loss through the packaging and conduit 250 combine to facilitate the generation of slight temperature differentials. To help further minimize the temperature gradients, the cups may be made thicker. In one embodiment of the invention, the cups 220, 230 are approximately 50 mils in thickness.

Figure 5:
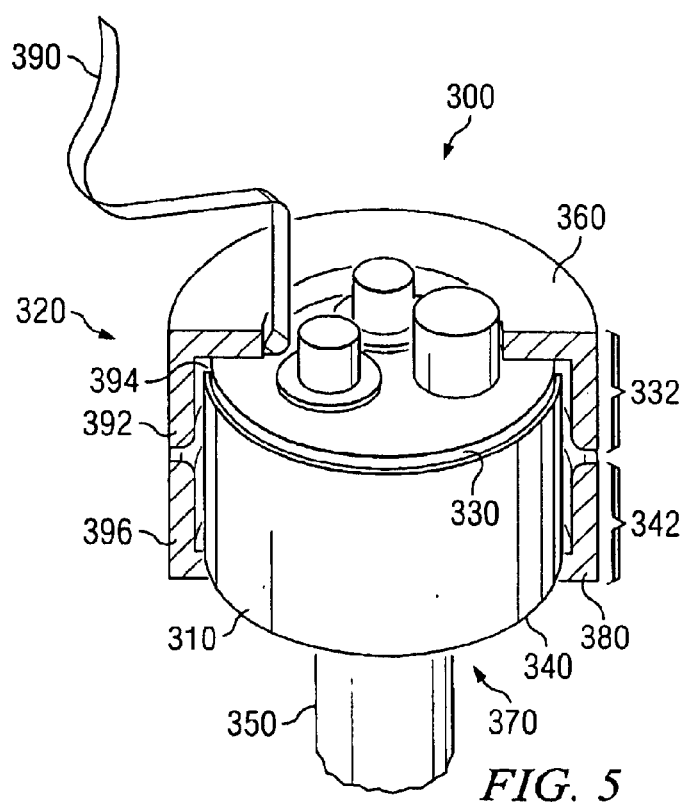
FIG. 5 shows a cross section of an embodiment of the temperature regulator of the present invention coupled to a variable capacitance manometer.

Turning now to FIG. 5, an embodiment 300 of the present invention is illustrated in partial cross sectional view, and includes a temperature regulator 320 and a temperature sensor 390. The device 300 of the present invention may be configured to be coupled to a pressure sensing device 310, which in the pictured embodiment is a variable capacitance sensor. A conduit 350 serves to communicate pressure between the variable capacitance manometer and the process with which the variable capacitance manometer is being utilized. Gas can flow through this conduit 350 and deflect a pressure sensing diaphragm in the variable capacitance sensor 310. The variable capacitance sensor 310 translates the deflection of the diaphragm into a change in capacitance reflective of the pressure inside the variable capacitance manometer.

As noted earlier, it is desirable to operate the variable capacitance sensor 310 at an elevated temperature. Temperature regulator 320 surrounds variable capacitance sensor 310 and alleviates the condensation of gases and materials on the diaphragm of variable capacitance sensor 310 by elevating the temperature of variable capacitance sensor 310. Temperature regulator 320 also improves the uniformity and consistency of the variable capacitance sensor's temperature.

Because conduit 350 must extend beyond temperature regulator 320 in order to interface with the remainder of the mechanism hosting the gas flow, it is exposed to external influences, such as a lower temperature environment and temperature fluctuations. Consequently, conduit 350 acts as a heat sink for the variable capacitance sensor 310, and a heat loss area forms where conduit 350 extends beyond the temperature regulator 320. This heat loss area causes a temperature gradient to form inside variable capacitance sensor 310, from a relatively hotter zone furthest from conduit 350 to a relatively cooler zone closest to the conduit 350.

To help deal with this temperature gradient, temperature regulator 320 has two temperature regulated zones 330, 340, which generally comprise the upper and lower halves of the variable capacitance sensor, respectively. While temperature regulator 320 may comprise one element, in the embodiment depicted in FIG. 5 temperature regulator 320 is composed of two thermally conductive cups 332, 342 which at least partially envelope the variable capacitance sensor 310. Each cup 332, 342 corresponds to a temperature regulated zone 330, 340. In one embodiment, each cup 332, 342 has a corresponding heating element. These heating elements may encompass all or part of the circumference of the respective cups. These heating elements may be controlled individually or in tandem to regulate the temperature of variable capacitance sensor 310.

In order to better regulate the temperature within the variable capacitance sensor 310, temperature regulator 320 can be directly thermally coupled to variable capacitance sensor 310. While in one embodiment of the present invention this direct coupling occurs in two locations, this coupling may be accomplished by directly heating only conduit 350 while heating the remainder of variable capacitance sensor 310 indirectly through an airspace. But this method is usually cumbersome and inefficient. Another possible choice is to heat variable capacitance sensor 310 directly over a significant portion of its surface area. This type of direct heating, while more efficient, is less effective at directing heat to the needed areas and ridding the variable capacitance sensor 310 of temperature gradients.

In the depicted embodiment, the temperature regulator 320 is directly thermally coupled to the variable capacitance sensor 310 within each of the two temperature regulated zones 330, 340. Temperature regulator 320 is directly thermally coupled (i.e. directly contacts)in one temperature regulated zone 340 to the variable capacitance sensor 310 at the conduit 350 which serves to communicate pressure to the variable capacitance sensor. A second direct thermal coupling 360 to variable capacitance sensor 310 occurs in the other temperature regulated zone 330. This secondary thermal coupling 360 is located generally opposite the first thermal coupling 370 in order to provide uneven heating to counteract temperature gradients that might arise due to thermal loss at the conduit 350 of variable capacitance sensor 310.

To help further reduce temperature gradients and maintain a set point temperature, a thermally insulating layer 380 is positioned between temperature regulator 320 and variable capacitance sensor 310. The temperature of temperature regulator 320 and exterior of variable capacitance sensor 310 are physically near each other, leaving little space for insulation. Therefore, insulating layer 380 may be need to be thin, but should still prove effective at insulating variable capacitance sensor 310. Thermally insulating layer 380 may comprise air, insulating foam, or other insulators.

The device 300 depicted in FIG. 5 also includes a temperature sensor 390 which facilitates control of the temperature regulator 320 by sensing the temperature difference between the two temperature regulated zones 330, 340. Temperature sensor 390 may have independent temperature sensing devices located in each of the temperature regulated zones 330, 340. In addition, temperature sensing device 390 may have the ability to measure ambient temperature.

In one particular embodiment, the temperature sensor 390 is a thermopile consisting of a flexible printed circuit. This flexible printed circuit contains a resistive thermocouple device 392 for measuring ambient temperature, and two thermocouple junctions 394, 396 each of which is located in one of the temperature regulated zones 330, 340. These two thermocouple junctions 394, 396 are used to measure the temperature differential between the two temperature regulated zones 330, 340. This temperature information is then used to provide control inputs to temperature regulator 320.

FIG. 6 depicts one embodiment of the temperature sensor. As mentioned previously, temperature sensor 400 may measure a temperature differential, and ambient temperature. Temperature sensor 400 may be a printed circuit board thermopile device, or as depicted here a flexible printed circuit board thermopile device 410. Flexible printed circuit board thermopile 410 contains two temperature sensing locations 420, 430 configured to measure a temperature difference between them, a temperature sensor 440 configured to measure ambient temperature and a connector 450 to communicate the sensed temperature information to a controller. In the illustrated case, ambient temperature sensor 440 is a resistive thermocouple device and differential temperature sensors 420, 430 are thermocouple junctions configured to produce a voltage based upon the sensed temperature difference between them.

Although the present invention has been described in detail herein with reference to the illustrative embodiments, it should be understood that the descriptions are by way of example only and are not to be construed in any limiting sense. It is to be further understood, therefore, that various changes, substitutions and alterations will be apparent to, and may be made by, persons of ordinary skill in the art who have reference to this specification. It is contemplated that such changes can be made hereto without departing from the scope of the invention as described by the appended claims.

What is claimed is:

1. A system, comprising
   a sensor;
   a temperature regulator thermally coupled to the sensor wherein the temperature regulator has at least two temperature regulated zones;
   a temperature sensor configured to sense the temperature differential between the at least two zones; and
   a controller configured to adjust the temperature regulator based upon the sensed temperature differential.

2. The system of claim 1, wherein the sensor is a variable capacitance manometer, the temperature regulator comprises two cups configured to at least partially encompass the variable capacitance manometer, one of the two cups in direct thermal contact with a conduit which serves to communicate pressure to the variable capacitance manometer, and the other cup in direct thermal contact with the variable capacitance manometer opposite the conduit, the temperature sensor is a flexible printed circuit comprising two thermocouple junctions and a resistive thermocouple device configured to measure the ambient temperature, one thermocouple junction located in one of the at least two temperature regulated zones, and the other thermocouple junction located in another of the at least two temperature regulated zones; and the controller is a closed loop controller.

3. The system of claim 1, wherein the sensor is a variable capacitance manometer.

4. The system of claim 3, wherein the temperature regulator comprises two cups configured to at least partially encompass the variable capacitance manometer.

5. The system of claim 4, wherein one of the two cups is in direct thermal contact with a conduit which serves to communicate pressure to the variable capacitance manometer, and the other cup is in direct thermal contact with the variable capacitance manometer opposite the conduit.

6. The system of claim 3, further comprising a layer of thermal insulation between the temperature regulator and the variable capacitance manometer.

7. The system of claim 6, wherein the layer of thermal insulation is air.

8. The system of claim 3, wherein the temperature sensor comprises two thermocouple junctions, one located in one of the at least two temperature regulated zones, and the other thermocouple junction located in another of the at least two temperature regulated zones.

9. The system of claim 8, wherein the temperature sensor further comprises a resistive thermocouple device configured to measure the ambient temperature.

10. The system of claim 3, wherein the temperature sensor is a printed circuit.

11. The system of claim 10, wherein the printed circuit is flexible.

12. The system of claim 3, wherein the controller is a closed loop controller.

13. The system of claim 1, wherein the temperature regulator comprises at least two separate heating elements.

14. A device, comprising
   a temperature regulator configured to be coupled to a sensing device wherein the temperature regulator has at least two temperature regulated zones;
   a temperature sensor configured to sense the temperature differential between the at least two zones; and
   a controller configured to adjust the at least two temperature regulated zones based upon the sensed temperature differential.

15. The device of claim 14, wherein the temperature regulator comprises two cups configured to at least partially encompass the pressure sensor.

16. The device of claim 15, wherein one of the two cups is in direct thermal contact with a conduit which serves to communicate pressure to the pressure sensor, and the other cup is in direct thermal contact with the pressure sensor opposite the conduit.

17. The device of claim 14, further comprising
   a layer of thermal insulation between the temperature regulator and the pressure sensor.

18. The device of claim 17, wherein the layer of insulation is air.

19. The device of claim 14, wherein the temperature sensor comprises two temperature sensors, one temperature sensor located in one of the at least two temperature regulated zones, and the other temperature sensor located in another of the at least two temperature regulated zones.

20. The device of claim 19, wherein the temperature sensor further comprises a device configured to measure the ambient temperature.

21. The device of claim 14, wherein the temperature sensor is a thermopile.

22. The device of claim 14, wherein the temperature sensor is a printed circuit.

23. The device of claim 22, wherein the printed circuit is flexible.

24. The device of claim 14, wherein the temperature regulator comprises at least one heating element.

25. The device of claim 14, wherein the pressure sensing device is a variable capacitance sensor.

26. The device of claim 25, wherein the temperature regulator is in direct thermal contact with the variable capacitance sensor.

27. The device of claim 25, wherein the controller is a closed loop controller.

28. A method, comprising measuring a temperature difference between at least two zones of a sensor; and adjusting the temperature within at least one of the at least two zones to minimize the measured temperature difference.

29. The method of claim 28, wherein measuring the temperature difference between the at least two zones of a pressure sensor comprises producing a voltage based on the temperature difference between the at least two zones.

30. The method of claim 28, further comprising reporting the measured temperature to a controller configured to adjust the temperature between the at least two temperature regulated zones.

31. The method of claim 28, further comprising measuring the ambient temperature of the sensor and adjusting the temperature within at least one of the at least two zones in response to the ambient temperature.

* * * * *